United States Patent [19]

Wagensonner et al.

[11] 4,006,975
[45] Feb. 8, 1977

[54] FADE-OVER APPARATUS FOR A MOTION PICTURE CAMERA

[75] Inventors: Eduard Wagensonner, Aschheim; Alfred Winkler, Munich, both of Germany

[73] Assignee: AGFA-Gevaert, A.G., Leverkusen, Germany

[22] Filed: July 23, 1975

[21] Appl. No.: 598,386

[30] Foreign Application Priority Data

July 26, 1974 Germany ............................ 2436019

[52] U.S. Cl. .............................. 352/91 C; 352/915; 354/23 D
[51] Int. Cl.² ......................................... G03B 21/36
[58] Field of Search .............. 352/91 R, 91 C, 91 S; 354/83 D, 44

[56] References Cited

UNITED STATES PATENTS

| | | | |
|---|---|---|---|
| 3,701,594 | 10/1972 | Keiner | 352/91 S |
| 3,712,721 | 1/1973 | Keiner et al. | 352/91 S |

Primary Examiner—Russell E. Adams, Jr.
Attorney, Agent, or Firm—Michael J. Striker

[57] ABSTRACT

Pressing of the camera release button causes start of the film transport and automatic setting of the diaphragm for a normal exposure. When fade-over switch is closed, a forward-reverse counter is started. When the count on the counter reaches 31, a first AND-gate switches a first JK flip-flop to a second state wherein an additional resistor is inserted in the normally balanced diaphragm control circuit thereby unbalancing same and causing the closing of the diaphragm to commence. When the count on the counter reaches 63, another AND-gate switches additional JK flip-flops for reversing both the film transport and the counting direction of the counter. When the counter has counted down to a predetermined number, further logic circuits cause a stoppage of the film transport and stopping and resetting of the counter so that reactivation of the release button automatically starts the fade-in.

12 Claims, 4 Drawing Figures

FADE-OVER APPARATUS FOR A MOTION PICTURE CAMERA

BACKGROUND OF THE INVENTION

The present invention relates to motion picture cameras having automatic aperture control arrangements whereby either a normal exposure or a fade-in or a fade-out can be controlled in dependence upon the light falling on a light-sensitive element and the comparison of the resulting electrical signal from said light-sensitive element to a first or second reference signal. The known motion picture cameras of course also have film transport means.

SUMMARY OF THE INVENTION

It is an object of the present invention to furnish a motion picture camera of the above-described type wherein the fade-over operation is electronically controlled, thereby decreasing the space required for such control arrangements.

The present invention resides in a motion picture camera having film comprising a plurality of frames and film transport means for transporting said film along a predetermined path. The camera also has aperture control means including a light-sensitive element and means for furnishing a first or second reference signal in response to a first or second control signal, respectively, said first and second reference signals causing said control means to adjust the size of the aperture of the camera for normal or fade-out exposure respectively. The present invention comprises a fader arrangement which includes means for furnishing a start signal for initiating the fade-out. It further comprises counting means connected to said means for furnishing a start signal for counting the number of frames transported along said predetermined path following receipt of said start signal. The counting means furnish counting signals corresponding to the number of so-counted frames. First circuit means are connected between the counting means and the aperture control means for furnishing said second control signal to said aperture control means in response to a first predetermined one of said counting signals. This initiates the fade-out. Second circuit means are connected between said counting means and the film-transport means for furnishing a stop signal stopping the film transport means in response to a second predetermined one of said counting signals. The second predetermined one of the counting signals follows the first predetermined one of the counting signals by a predetermined number of counts at least sufficient for completion of the fade-out.

In a preferred embodiment of the present invention the fader arrangement further comprises third circuit means connected between said counting means and said film-transport means for furnishing a reverse control signal to said film-transport means thereby reversing its direction in response to a third predetermined one of said counting signals. The third predetermined one of said counting signals precedes said second predetermined one of the counting signals, that is the film transport is reversed prior to being stopped in a preferred embodiment of the present invention. In a further preferred embodiment of the present invention the counting means are a forward-reverse counter, and additional circuit means are furnished for switching said forward-reverse counter to the reverse counting mode upon receipt of said third predetermined one of said counting signals.

In a preferred embodiment of the present invention the first, second and third as well as the additional circuit means each comprise a JK flip-flop.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2a is a block diagram showing a JK flip-flop; and

FIG. 2b is the truth table associated with the JK flip-flop of FIG. 2a.

Figure 1A:
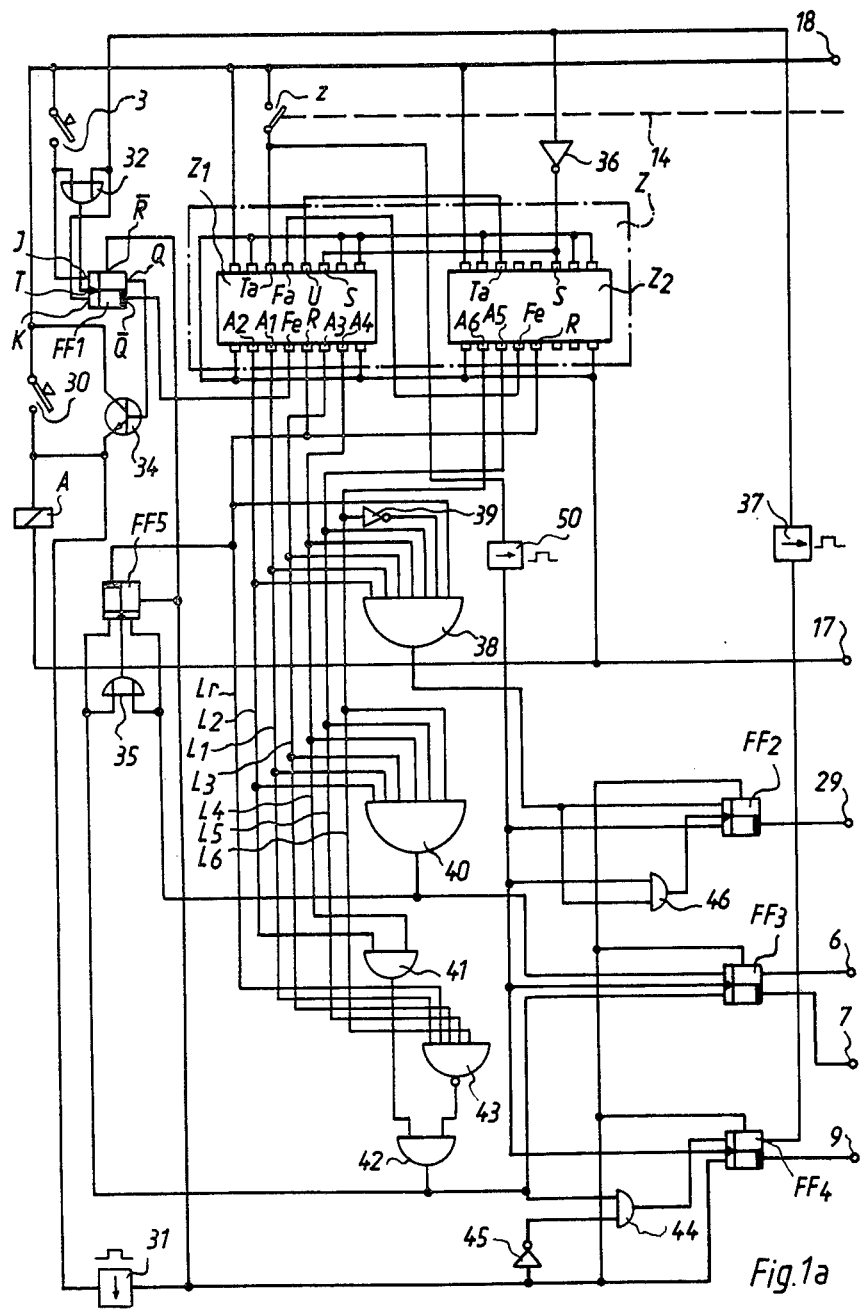
FIGS. 1a and 1b together constitute a schematic diagram of the preferred embodiment of the present invention.

DESCRIPTION OF THE PREFERRED EMBODIMENTS:

A preferred embodiment of the present invention will now be described with reference to the drawing.

Figure 1B:
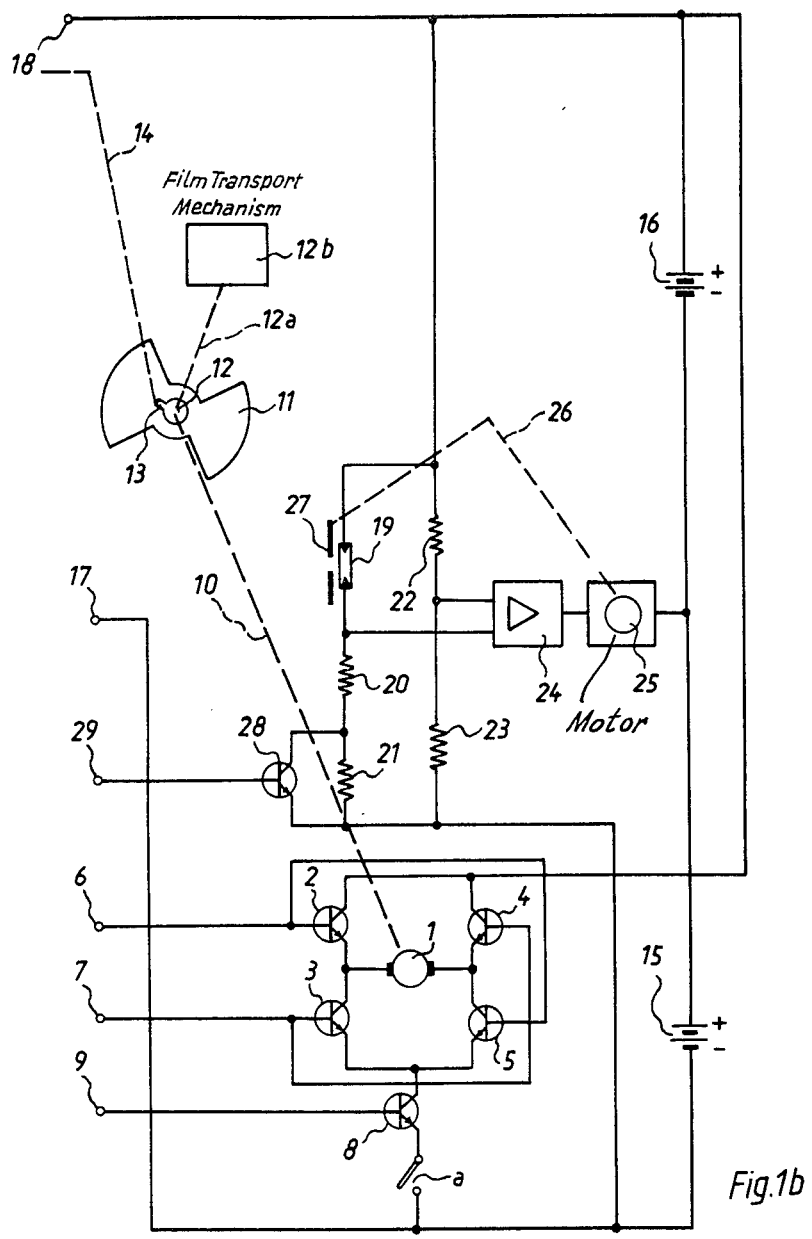

FIG. 1b shows a motor 1, part of the film transport means, which is connected in a bridge circuit whose branches include transistors 2, 3, 4 and 5. The bases of transistors 2 and 5 are connected in common to a terminal 6, while the bases of transistors 3 and 4 are similarly connected in common to a terminal 7. The collector-emitter circuit of a transistor 8 is connected in series with the above-described bridge circuit. The base of transistor 8 is connected to a terminal 9. The contacts a of a relay A (FIG. 1a) are connected in the emitter circuit of transistor 8.

A mechanical connection 10 interconnects motor 1 to a rotary shutter 11 whose shaft 12 has a projection 13. Projection 13 is coupled to a mechanical coupling 14 which in turn is coupled to a contact labelled z in FIG. 1a. Further, shaft 12 is mechanically coupled to the film transport mechanism 12b via a coupling 12a.

Two batteries are denoted by reference numerals 15 and 16 respectively. The negative side of battery 15 is connected to a terminal 17 while the positive side of battery 16 is connected to a terminal 18. The batteries are connected in series.

An aperture control circuit includes a voltage divider having a light sensitive resistor 19, a resistor 20, and a fade-out resistor 21. A second voltage divider includes a resistor 22 as well as a resistor 23. The taps of the two voltage dividers are connected to two inputs of a comparator amplifier 24 whose output drives a motor 25. A mechanical coupling 26 couples motor 25 to a diaphragm 27 which is arranged in the path of the light impinging upon photosensitive element 19. Connected in parallel with the fade-out resistor 21 is the emitter-collector circuit of a transistor 28 whose base is connected to a terminal 29. It should be noted that the same components and terminals when shown in FIGS. 1a and 1b have the same reference numerals.

Figures 2A, 2B:
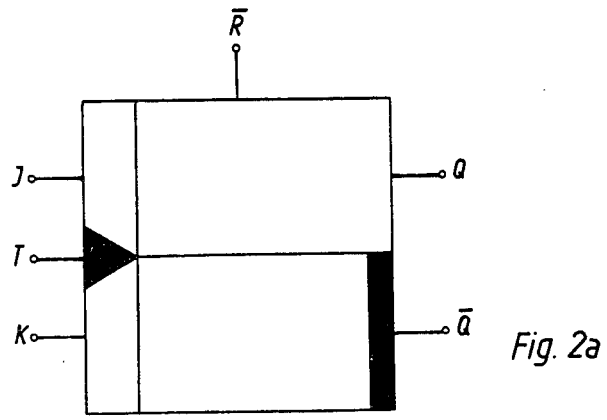

The release button operable by the photographer is denoted by reference numeral 30 in FIG. 1a. Operation of this button results in the normal camera operation and causes energization of relay A. Further, operation of button 30 causes the switching of a monostable multivibrator 31 to the unstable state wherein a positive pulse is furnished for a predetermined time interval. Five JK master-slave flip-flops have reference numerals FF1, FF2, FF3, FF4 and FF5 respectively. The terminals associated with the flip-flops are shown in FIG. 2a; J and K refer to control inputs, T refers to a clock input, Q and $\overline{Q}$ respectively denote the first and second output while $\overline{R}$ denotes a reset input. Truth tables for these flip-flops are shown in FIG. 2b. To summarize the truth tables, a signal applied to the $\overline{R}$ input results in a "1" output at the $\overline{Q}$ terminal and therefore a "0" output at the Q output, regardless of the previous setting of the flip-flop and independent of the clock signal. A signal applied at the J input will cause a 1 output at the Q output subsequent to the next clock signal applied at the T input; a signal at the K input will cause a 1 at the $\overline{Q}$ output following the next-subsequent clock signal at the T input. Finally, if signals are present at both the J and K inputs when a clock signal is received, the signals at the Q and $\overline{Q}$ outputs will be reversed from their previous state.

Start signal furnishing means for starting the fadeout operation comprise a switch 33 in FIG. 1a. Switch 33 is connected to the J input of flip-flop FF1. A transistor 34 has an emitter-collector circuit connected in parallel with switch 30. The emitter is also connected to the input of monostable multivibrator 31.

The J and K inputs of flip-flop FF5 are connected to the inputs of an OR-gate 35 whose output is connected to the clock input of flip-flop FF5. A forward-reverse counter, part of counting means, is denoted by Z in FIG. 1a and comprises two equivalent counting stages Z1 and Z2. Each of stages Z1 and Z2 has four outputs. The outputs of stage Z1 are denoted by A1, A2, A3 and A4. Only two of the outputs of the second counting stage, respectively denoted by A5 and A6, are utilized. Outputs A1–A6 are connected to lines L1–L6, respectively. Each of the counting stages further has an input denoted by R to which is connected a line Lr. The signal at the R inputs determines the counting direction. If the signal is a 1, the counter counts in the forward direction, while a 0 signal results in a reverse count. Each of stages Z1 and Z2 further has an input Fe. Input Fe of counting stage Z1 is connected to the $\overline{Q}$ output of flip-flop FF1, the Q output of which is connected to the base of transistor 34. The input Fe of stage Z2 is connected to an output Fa of stage Z1. A 1 signal at input Fe of stage Z1 causes the counter to be blocked while a 0 signal enables the counter.

An input S in each of stages Z1 and Z2 is a reset input whereby each of the stages is reset to its original state. A clock or counting input is denoted by Ta. This input is connected to the contact z.

The clock input Ta of stage Z2 is connected to an output U of stage Z1. A signal is furnished at output U when counting stage Z1 overflows. For a binary counter as is counter Z, the capacity of stage Z1 will be exceeded with the sixteenth pulse. An inverter stage 36 has an output connected to the S inputs of stages Z1 and Z2. The input of the inverter is connected to the output of a monostable multivibrator 37 whose output is also connected with the K input of flip-flop FF1. Further shown in FIG. 1a is an AND-gate 38, herein referred to as a first AND-gate which has seven inputs. The first five inputs are connected to lines L1, L2, L3, L4 and L5, while the sixth input is connected to line L6 through an inverter 39. The last input of AND-gate 38 is connected to line Lr.

Upon occurrence of the thirty-first pulse at input Ta, all lines L1 to L6 carry a 1 signal and, when count 31 is reached in the forward direction, so does line Lr. Thus throughout the thirty-first pulse, AND-gate 38 furnishes a 1 output. The output of AND-gate 38 is connected to the J input of flip-flop FF2. FIG. 1a also shows an AND-gate 40 herein referred to as a third AND-gate. AND-gate 40 has six inputs each of which is directly connected to a corresponding one of lines L1–L6. Upon receipt of the sixty-third pulse all of these lines carry a 1 signal. Thus a 1 signal appears at the output of AND-gate 40 which is connected to the J input of flip-flop FF3.

FIG. 1a also shows an AND-gate 41 which has two inputs. The first input is directly connected to line L2 while the second input is directly connected to line L4. The output of AND-gate 41 is connected to the first input of an AND-gate 42.

Each of lines L1, L3, L5, L6 and Lr is also connected through an inverter to the input of an NAND-gate 43 whose output is connected to the second input of AND-gate 42. The output of AND-gate 42 is connected to the K input of flip-flops FF3 and is further connected to the input of an AND-gate 44 whose other input is connected through an inverter 45 with the output of monostable multivibrator 31. The output of AND-gate 44 is connected to the J input of flip-flop FF4. The K input of flip-flop FF4 is connected to the output of monostable multivibrator 31.

The output of monostable multivibrator 31 is further connected to the $\overline{R}$ inputs of all flip-flops. Further, contact z is connected to the T inputs of flip-flops FF2, FF3 and FF4.

The clock input of flip-flop FF2 is connected to the output of an AND-gate 46 whose first input is connected to the output of AND-gate 38 while its second input is connected through contact z through a monostable multivibrator 50.

The output of AND-gate 42 is also connected to the K input of flip-flop FF5. The K input of flip-flop FF2 is also connected to the output of monostable multivibrator 50.

The $\overline{Q}$ output of flip-flop FF2 is connected to a terminal 29 which is connected with the base of transistor 28. The Q output of flip-flop FF3 is connected to a terminal 6 which is connected to the base of transistor 2 and 5. The $\overline{Q}$ output of flip-flop FF3 is connected to a terminal 7 which is connected to the bases of transistors 3 and 4. The $\overline{Q}$ output of flip-flop FF4 is connected to a terminal 9 which is connected to the base of transistor 8.

The above-described arrangement operates as follows:

At first, switch 33 is open and the photographer closes switch 30. This causes energization of relay A which is then connected through terminals 17 and 18 to batteries 16 and 15. Contact a closes. The emitter of transistor 8 is then connected to the negative side of battery 15. Further, monostable multivibrator 31 is switched to the unstable state so that a 1 signal appears at its output for a predetermined time. This 1 signal is applied to the $\overline{R}$ inputs of all flip-flops so that all $\overline{Q}$ outputs of the flip-flops carry a 1 signal.

Transistor 8 is switched to the conducting state by the $\overline{Q}$ output of flip-flop FF4 as are transistors 3 and 4 by the 1 signal at terminal 7. The signal at terminal 6 at this time of course is a 0 whereby transistors 2 and 5 are in the blocked state. Motor 1 thus rotates in the forward direction. Motor 1 drives rotary shutter 11 and the film transport 12b. For each rotation of rotary shutter 11 the contact z is activated. The resulting pulses although applied to terminal Ta do not cause the counter to advance, since at this point the counter is not activated.

The 1 signal appearing at terminal 29 causes transistor 28 to be fully conductive thereby short-circuiting resistor 21. When resistor 21 is short-circuited, the bridge circuit is balanced when the light falling on photosensitive element 19 is the light required for a normal exposure. Thus motor 25 will adjust diaphragm 27 until such time as the bridge is balanced and the light reaching the film is that required for the above-mentioned normal exposure.

If now a fade-over is to be accomplished, the photographer closes switch 33. This causes a 1 signal to be applied to the J input of flip-flop FF1 while its K input carries a 0 signal. Further, the closing of switch 33 causes a positive pulse to be applied to the clock input of flip-flop FF1 through OR-gate 32. The signal at the $\overline{Q}$ output of flip-flop FF1 thus changes to 0. The Q output of this flip-flop will then of course carry the 1 potential. Transistor 34 is switched to the conductive state causing it to maintain the energization of relay A independent of the state of contact 30. The 0 signal at the $\overline{Q}$ output of flip-flop FF1 is applied to the Fe input of counting stage Z1 causing this counting stage to be activated. The pulses applied by contact z will now be counted until, for the 31 count, lines L1–L5 carry a 1 signal while line L6 still carries the 0 signal. During the forward counting operation line Lr of course carries a 1 signal. This 1 signal is applied to line Lr from the $\overline{Q}$ output of flip-flop FF5. Because of inverter stage 39, AND-gate 38 furnishes an output for the thirty-first count in the forward direction.

The positive pulse of monostable multivibrator 31 also cause the $\overline{Q}$ output of flip-flop FF2 to carry a 1 signal. During the time extending from the first to the thirtieth pulse furnished by contact z, the J input of flip-flop FF2 received a 0 signal, while the K input oscillated between the 1 and the 0 signals. Similarly, one input of AND-gate 46, namely the input from AND-gate 38 also received a 0 signal prior to the thirty-first pulse while its other input similarly oscillated between the 1 and 0 signals. Since the clock input of flip-flop FF2 received a 0 signal throughout all this time, the $\overline{Q}$ output of flip-flop FF2 was maintained until the 31 pulse. Upon receipt of the 31 pulse AND-gate 38 carries a 1 signal. This signal is applied to the J input of flip-flop FF2 but will not change the output until receipt of the next clock signal. The next clock signal is furnished by the trailing edge of the output of monostable multivibrator 50. Monostable multivibrator 50 thus serves as a delay to make certain that the signal at the output of AND-gate 38 has been applied to the J input of flip-flop FF2 prior to the application of the clock signal. It is thus the purpose of monostable multivibrator 50 to compensate for delay times generated in the counting and AND-circuits.

When a 1 signal is present at the output of AND-gate 38 and a signal is received at the output of monostable multivibrator 50, both inputs of AND-gate 46 receive a 1 signal causing it to furnish an output clocking flip-flop FF2. The flip-flop will thus switch to the state where the $\overline{Q}$ output carries a 0 signal. Transistor 28 is thus blocked. Resistor 21 is no longer short-circuited and the automatic control circuit commences to rebalance the bridge circuit by closing diaphragm 27. Of course the unbalance of the bridge circuit is such that the circuit will be rebalanced when the diaphragm has been closed a predetermined number of stops. The design of the aperture control circuit is such that the fade-out period has finished when the 63 counting pulse has been received. In other words the bridge is rebalanced when the 63 pulse has been furnished by contact z.

Upon occurrence of the sixty-third pulse, lines L1–L6 all carry a 1 signal. AND-gate 40 thus furnishes a 1 output. This 1 output is applied to the J input of flip-flop FF5 and also to the input of OR-gate 35. The latter causes a positive clock pulse to be applied to the clock input of flip-flop FF5 causing its $\overline{Q}$ output to change to the 0 state. This causes the counter to change to the reverse counting condition.

The 1 signal at the output of AND-gate 40 further is applied to the J input of flip-flop FF3. Upon the next closing of contact z and the furnishing of a signal by monostable multivibrator 50, this causes the Q output of flip-flop FF3 to change from 0 to 1. Simultaneously of course the $\overline{Q}$ output changes from 1 to 0. This change in flip-flop FF3 causes transistors 3 and 4 to be blocked while the previously blocked transistors 2 and 5 are switched to the conductive state. Motor 1 then turns in the opposite direction and reverses the direction of film transport.

Transistor 28 remains blocked since the 0 signal at the $\overline{Q}$ output of flip-flop FF2 remains. This is because while the counter is counting up after the 31 pulse, the output of AND-gate 38 is a 0 signal so that flip-flop FF2 receives no further clock pulses. Further, during the reverse counting AND-gate 38 does not furnish a 1 signal at all since its Lr inputs is 0.

The circuit continues unchanged until counter Z has counted back to the counting signal signifying a count of ten. For this count line L1 carries a 0 signal, line L2 a 1 signal, line L3 a 0 signal, line L4 a 1 signal, line L5 a 0 signal and line L6 a 0 signal. Thus lines L2 and L4 which form the inputs of AND-gate 41 both carry a 1 signal causing AND-gate 41 to furnish a 1 output which is applied to the input of AND-gate 42.

At the same time lines L1, L3, L5 and L6 each carry a 0 signal which, after passing through an inverter is furnished as a 1 signal to the corresponding input of NAND-gate 43. NAND-gate 43 thus furnishes an output to the second input of AND-gate 42 which causes the signal at the output of AND-gate 42 to assume a 1 value.

A 1 signal at the output of AND-gate 42 is applied to one input of AND-gate 44 whose other input receives a 1 signal via inverter 45. A 1 signal is thus applied to the J input of flip-flop FF4. Upon receipt of the next clock signal the $\overline{Q}$ output of flip-flop FF4 thus changes to a 0 signal. This causes transistor 8 to be blocked interrupting the energizing circuit of motor 1. The change in voltage at the Q output of flip-flop FF4 also causes monostable multivibrator 37 to change to the unstable state wherein it furnishes a positive pulse of predetermined width. This positive pulse is applied to the K input of flip-flop FF1. Further, OR-gate 32 supplies a clock signal to flip-flop FF1. This causes the Q output of flip-flop FF1 to change to 0. Transistor 34 is blocked. The 1 signal appearing at the $\overline{Q}$ output of flip-flop FF1 is applied to the Fe input of counter z, causing the counter to stop counting.

Further, the positive pulse at the output of monostable multivibrator 37 is applied through inverter 36 to the F input of stages Z1 and Z2. The counter is thus reset to its original value.

Blocking of transistor 34 causes relay A to be deenergized if switch 30 is open. This is generally the case when a fade-over operation is being carried out.

The 1 output of AND-gate 42 is also applied to the K input of flip-flop FF5 causing its $\overline{Q}$ output to carry a 1 signal. The counter is thus ready for forward counting.

At the beginning of the next filming operation switch 30 is of course closed causing relay A to be reenergized, its contact a to be closed and all flip-flops FF1-FF5 to be reset by the signal applied to the $\overline{R}$ input in such a manner that all $\overline{Q}$ outputs again carry a 1 signal. Resetting of flip-flop FF2 causes a 1 signal to be applied to the base of transistor 28 causing this to be fully conductive. The aperture control circuit is thus again unbalanced and will only be rebalanced when the aperture is again sufficiently open to effect a normal exposure. The equipment is thus ready for the fade-in.

While the invention has been illustrated and described as embodied in specific fade-over arrangements, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. In a motion picture camera having film including a plurality of frames, film transport means for transporting said film along a predetermined path, an aperture and aperture control means including a light-sensitive element and adjustment means for adjusting the size of said aperture to a normal or a fade-out size in response to a first or second control signal respectively, a fader arrangement, comprising, in combination, externally operable start signal furnishing means for furnishing a start signal initiating a fade-out; counting means connected to said start signal furnishing means for counting the number of frames transported along said predetermined path following receipt of said start signal and furnishing counting signals corresponding to the number of so-counted frames; first circuit means connected between said counting means and said aperture control means for furnishing said second control signal to said adjustment means in response to a first predetermined one of said counting signals, thereby initiating said fade-out; and second circuit means connected between said counting means and said film transport means for furnishing a stop signal stopping said film transport means in response to a second predetermined one of said counting signals following said first predetermined one of said counting signals by a predetermined time interval at least sufficient for completion of said fade-out.

2. Fader arrangement as set forth in claim 1, wherein said film transport means is operative in a forward direction in response to a forward control signal applied thereto and in a reverse direction in response to a reverse control signal applied thereto; wherein said second predetermined one of said counting signals follows said first predetermined one of said counting signals by a predetermined number of counts exceeding the number sufficient for completion of said fade-out; further comprising third circuit means connected between said counting means and said film transport means for furnishing said reverse control signal to said film transport means in response to a third predetermined one of said counting signals following said first predetermined one of said counting signals by a number of counts sufficient for completion of said fade-out but less than said predetermined number of counts, whereby said film is rewound by a predetermined number of frames prior to stopping of said film transport means.

3. Fader arrangement as set forth in claim 2, where said counting means comprise a forward-reverse counter having a control input and adapted to count forwards and in reverse in response to a forward count and a reverse count signal, respectively, applied to said control input; and wherein said third circuit means further comprise additional circuit means for furnishing said reverse count signal to said forward-reverse counter substantially simultaneously with the furnishing of said reverse control signal to said film transport means.

4. Fader arrangement as set forth in claim 3, wherein said first, second and third circuit means comprise, respectively, a first, second and third bistable circuit each having at least a first and second input, each adapted to switch to a first or second stable state in response to a signal at said first or second input respectively; and wherein said camera further has release means for starting the operation of said camera under external control; further comprising reset circuit means connected to said release means for resetting all of said bistable circuit means to said first stable state in response to activation of said release means.

5. Fader arrangement as set forth in claim 4, wherein each of said bistable circuits comprise a JK flip-flop.

6. Fader arrangement as set forth in claim 4, wherein said forward-reverse counter has a plurality of outputs each for furnishing a binary output signal, simultaneously present binary output signals constituting said counting signals; and wherein said first circuit means comprise a first AND-gate having inputs connected to said outputs of said forward-reverse counter and having an output connected to said first input of said first bistable circuit.

7. Fader arrangement as set forth in claim 4, wherein said forward-reverse counter has a plurality of outputs each for furnishing a binary output signal, all simultaneously present and not present binary output signals in combination constituting said counting signals; and wherein said first circuit means comprise a first AND-gate having inputs connected to said outputs of said forward-reverse counter and having an output connected to said first input of said bistable circuit.

8. Fader arrangement as set forth in claim 4, wherein said second circuit means comprise a second AND-gate having an output connected to said first input of said second bistable circuit and having a plurality of inputs, and logic circuit means connected between said outputs of said forward-reverse counter and said inputs of said second AND-gate for controlling said second AND-gate to furnish an output signal upon receipt of said second predetermined one of said counting signals.

9. Fader arrangement as set forth in claim 4, wherein said third circuit means comprise a third AND-gate having an output connected to said first input of said third bistable circuit and having a plurality of inputs connected with said outputs of said forward-reverse counter for controlling said third AND-gate to furnish an output signal upon receipt of said third predetermined one of said counting signals.

10. Fader arrangement as set forth in claim 3, wherein said additional circuit means comprise a JK flip-flop.

11. Fader arrangement as set forth in claim 3, further comprising means for connecting said control input of said forward-reverse counter to said first and second circuit means, for blocking said first circuit means thereby inhibiting the furnishing of said second control signal to said adjustment means when said forward-reverse counter is counting in reverse and for inhibiting the operation of said second circuit means thereby inhibiting the furnishing of said stop signal when said forward-reverse counter is counting forward.

12. Fader arrangement as defined in claim 2, the arrangement further including means operative subsequent to said rewinding of the film for thereafter causing the film transport means to transport the film along said path in forward direction and causing the adjustment means to effect a change of the setting of the aperture from fade-out to normal size so as to effect a fade-in of the next scene superimposed upon the fade-out of the preceding scene and accordingly constituting together a fade-over from the preceding to the subsequent scene.

* * * * *